United States Patent
Hessel et al.

(10) Patent No.: US 8,939,066 B2
(45) Date of Patent: Jan. 27, 2015

(54) CONVEYOR OVEN WITH DOORS AND SENSORS AND MEHOD OF OPERATING SAME

(76) Inventors: Lior Hessel, Kiryat Bialik (IL); Eran Hessel, Haifa (IL)

( * ) Notice: Subject to any disclaimer, the term of this patent is extended or adjusted under 35 U.S.C. 154(b) by 0 days.

(21) Appl. No.: 13/639,515

(22) PCT Filed: Apr. 7, 2011

(86) PCT No.: PCT/IB2011/051497
§ 371 (c)(1),
(2), (4) Date: Oct. 5, 2012

(87) PCT Pub. No.: WO2011/125038
PCT Pub. Date: Oct. 13, 2011

(65) Prior Publication Data
US 2013/0122158 A1    May 16, 2013

(30) Foreign Application Priority Data
Apr. 7, 2010    (IL) .......................................... 204898

(51) Int. Cl.
*A21B 1/42*    (2006.01)
*A21B 1/48*    (2006.01)
*A21B 3/02*    (2006.01)

(52) U.S. Cl.
CPC ... *A21B 1/42* (2013.01); *A21B 1/48* (2013.01); *A21B 3/02* (2013.01)
USPC ............. 99/325; 219/700; 219/739; 219/216; 219/388

(58) Field of Classification Search
CPC .............. A21B 1/00; A21B 1/42; A21B 1/48; A47J 37/044
USPC ............ 426/233; 99/325; 219/700, 739, 216, 219/388
See application file for complete search history.

(56) References Cited

U.S. PATENT DOCUMENTS

| | | | | |
|---|---|---|---|---|
| 4,244,285 A | * | 1/1981 | Baker | ............................. 99/339 |
| 4,951,648 A | * | 8/1990 | Shukla et al. | ................ 126/21 A |
| 5,138,150 A | | 8/1992 | Duncan | |
| 5,334,402 A | * | 8/1994 | Ovadia | .......................... 426/241 |
| 5,615,614 A | | 4/1997 | Van Pelt | |
| 2002/0088800 A1 | | 7/2002 | Miller | |
| 2005/0132899 A1 | | 6/2005 | Huang et al. | |
| 2005/0205547 A1 | | 9/2005 | Wenzel | |
| 2006/0245465 A1 | | 11/2006 | Saijo et al. | |
| 2007/0137633 A1 | * | 6/2007 | McFadden | ................... 126/21 A |

* cited by examiner

*Primary Examiner* — Anthony Weier
(74) *Attorney, Agent, or Firm* — Mark M. Friedman

(57) ABSTRACT

A reliable conveyor oven minimizes escape of heat by minimizing the time that inlet and outlet openings appear in the baking oven. This may reduce energy consumption by 25%. The baking oven may have a conventional oven and an extension chamber, an outlet opening of the conventional oven acting as an inlet to the extension chamber, the extension chamber having an exit door, the baking oven also having an entrance door defining an entrance inlet. A conveyor holding food items runs through a length of the baking oven. An exit optical sensor may be attached to the extension chamber on opposite sides of the extension chamber such shat an item on the conveyor moving through the extension chamber interrupts a signal between the transmitted and the receiver. The exit sensor may be operatively engaged to a controller for actuating the exit door open and closed rotationally using a pneumatic piston.

20 Claims, 14 Drawing Sheets

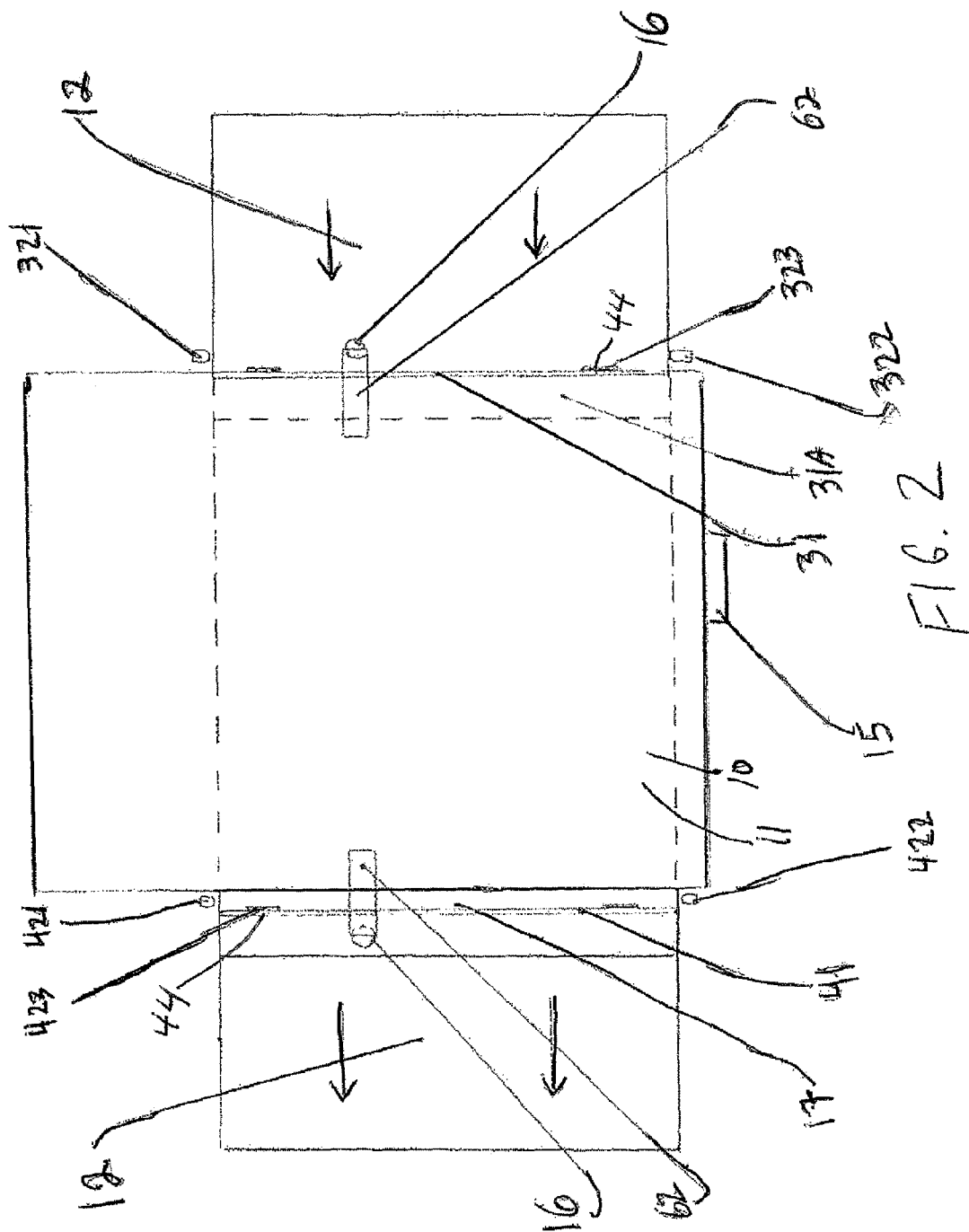

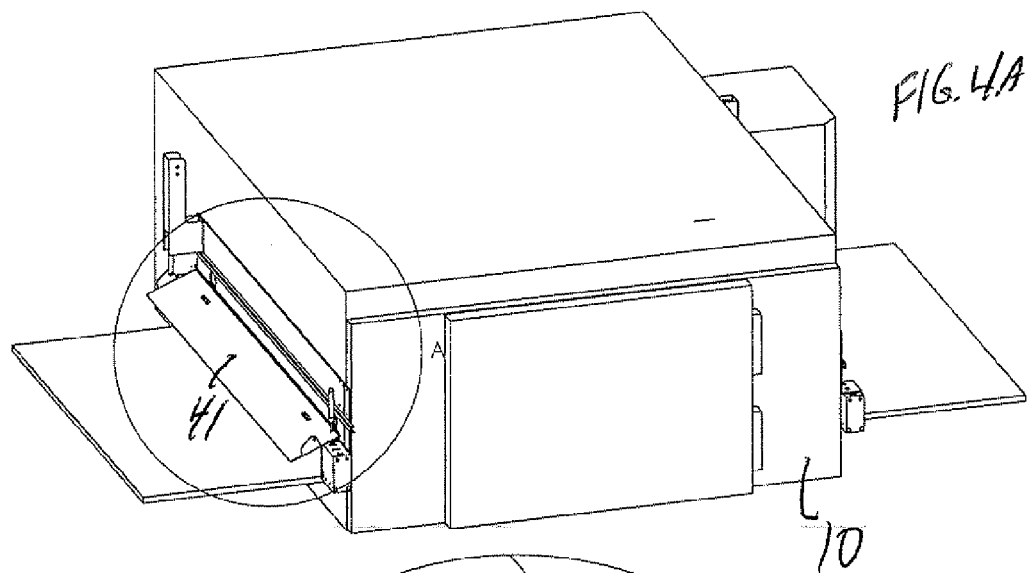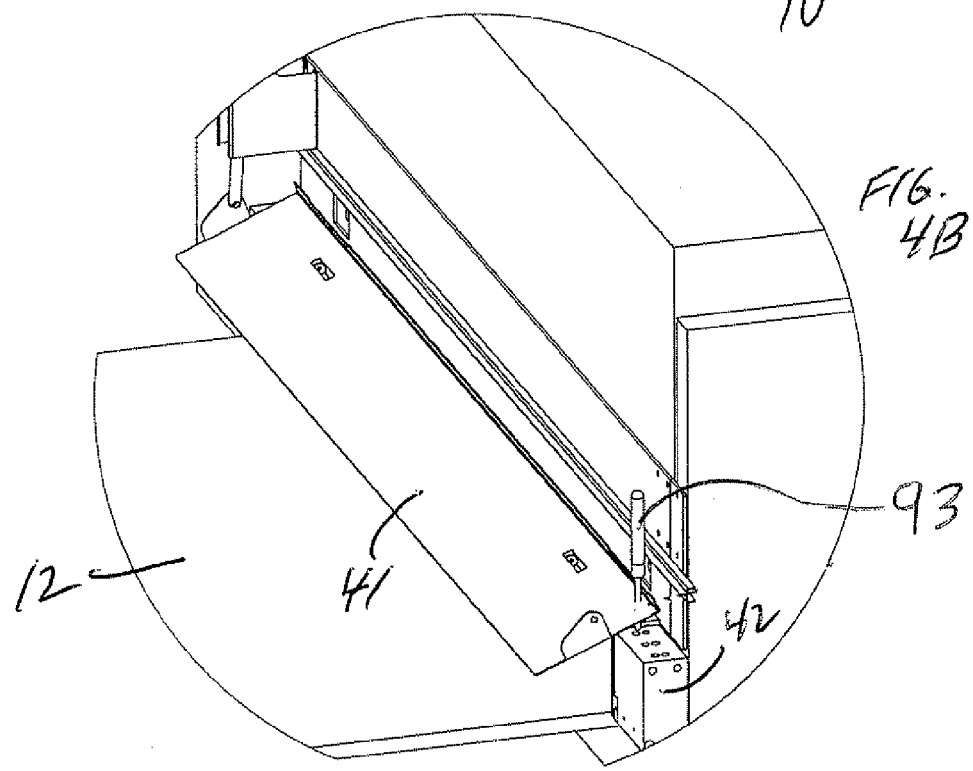

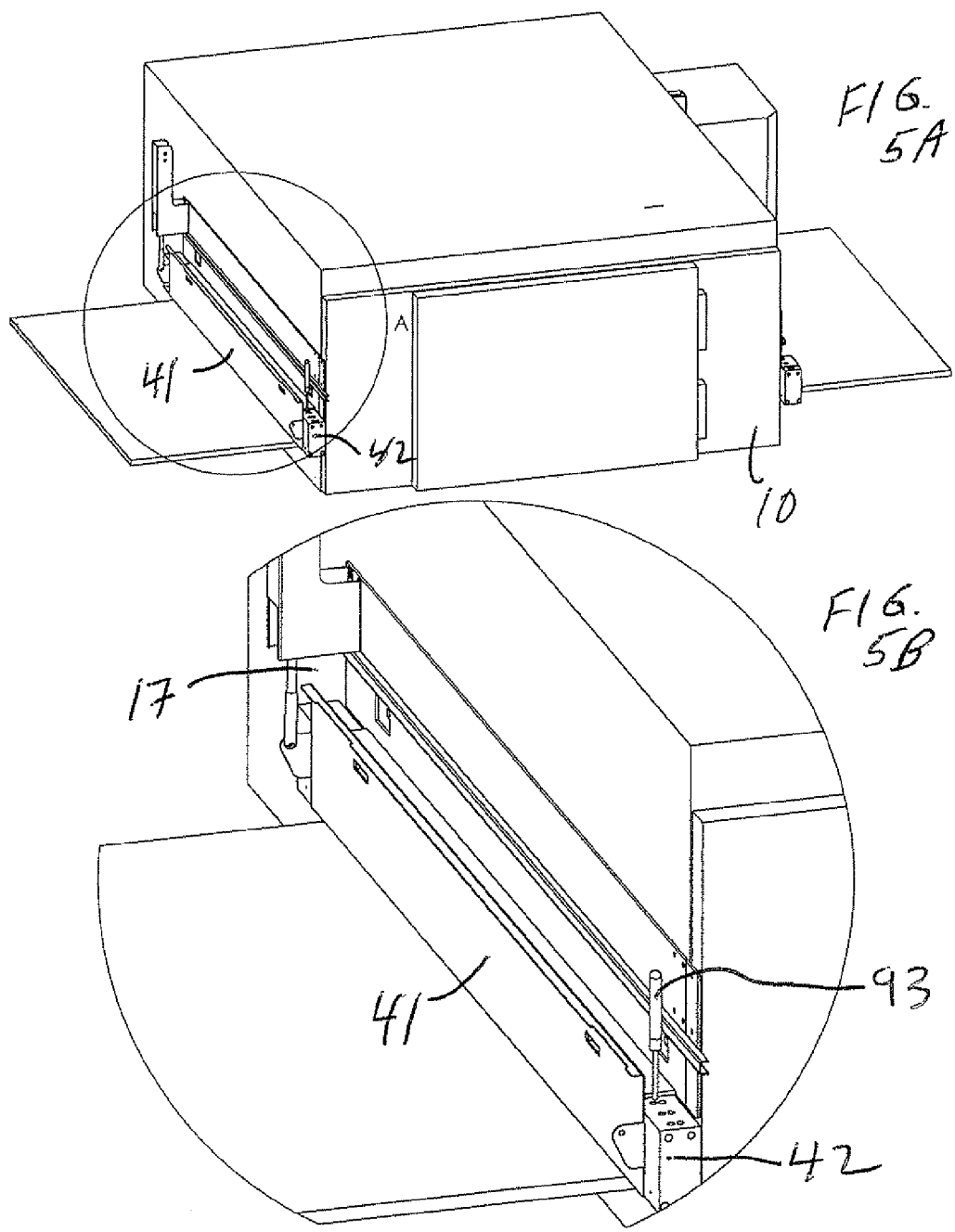

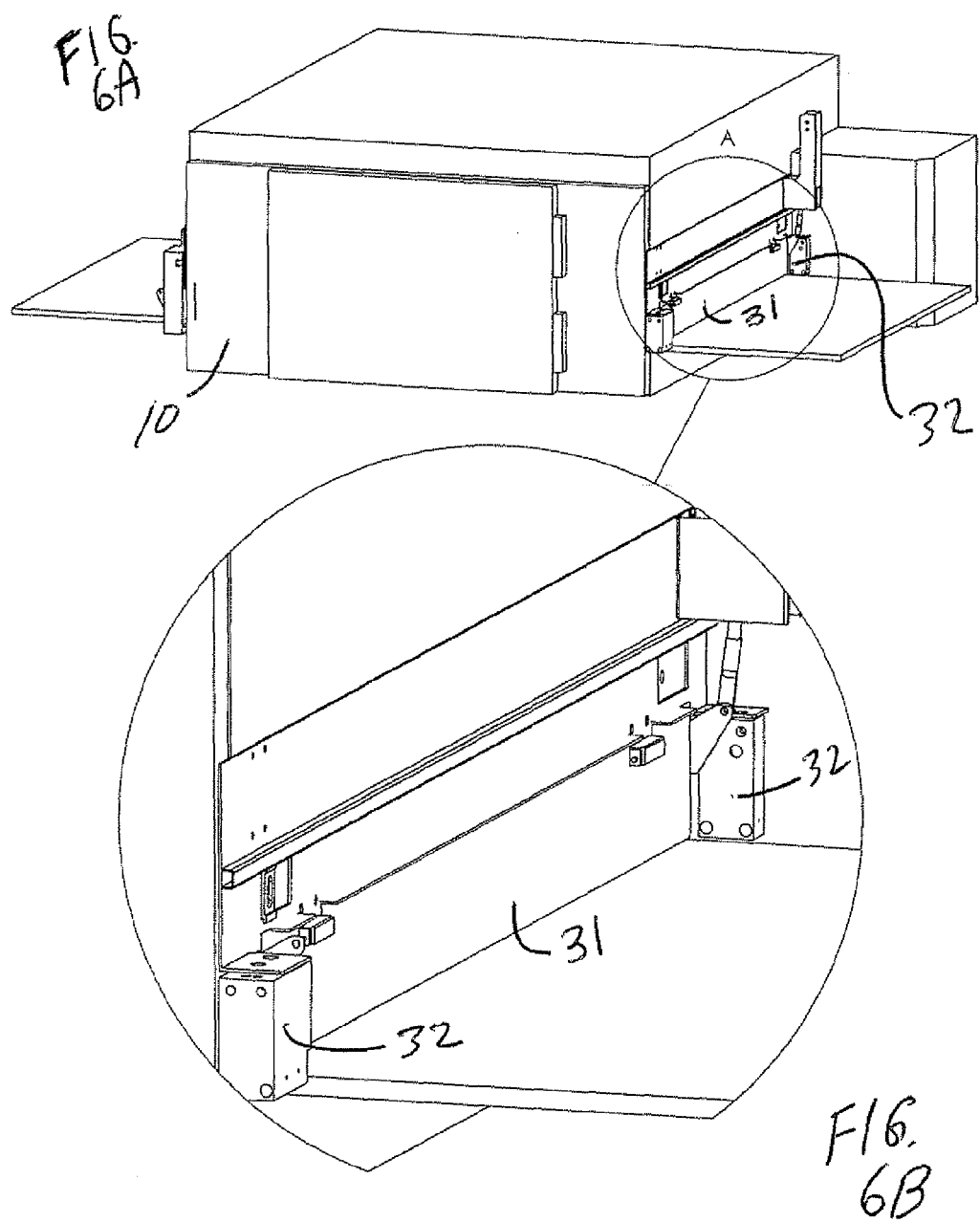

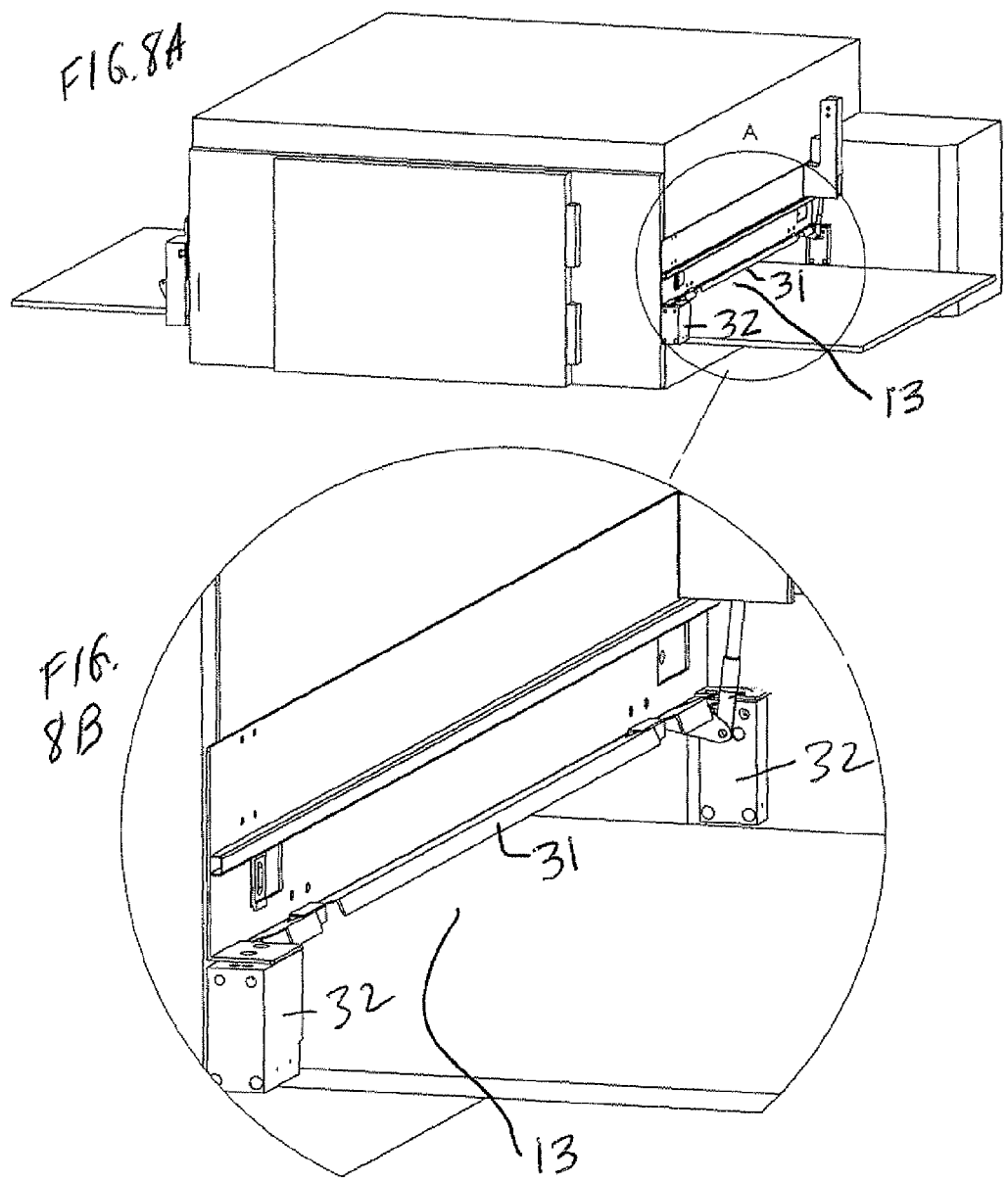

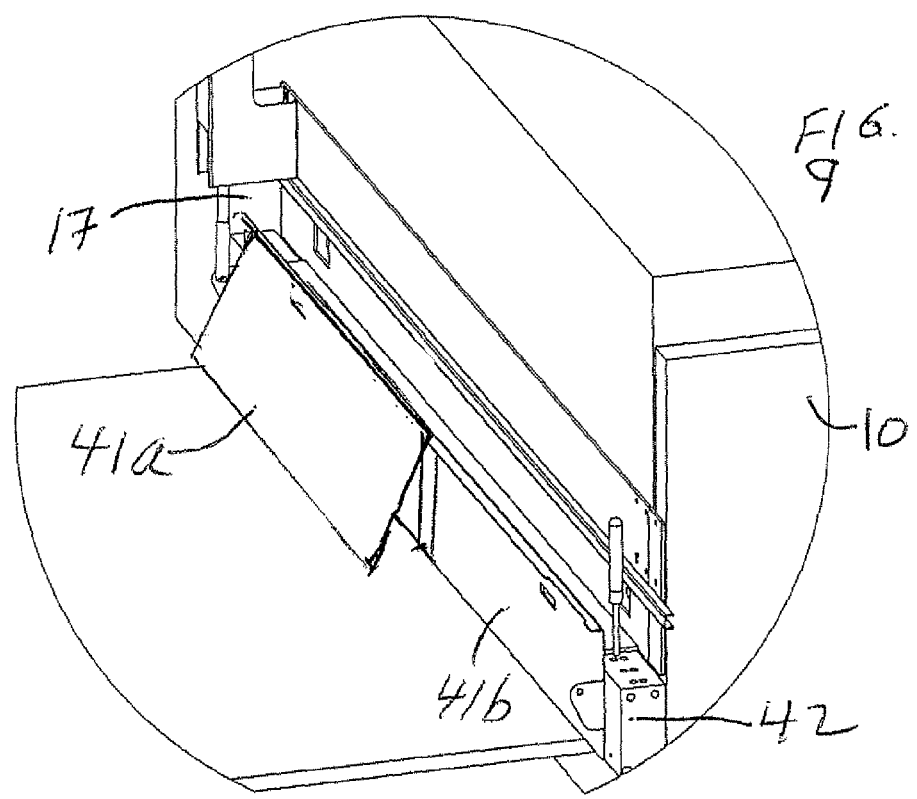

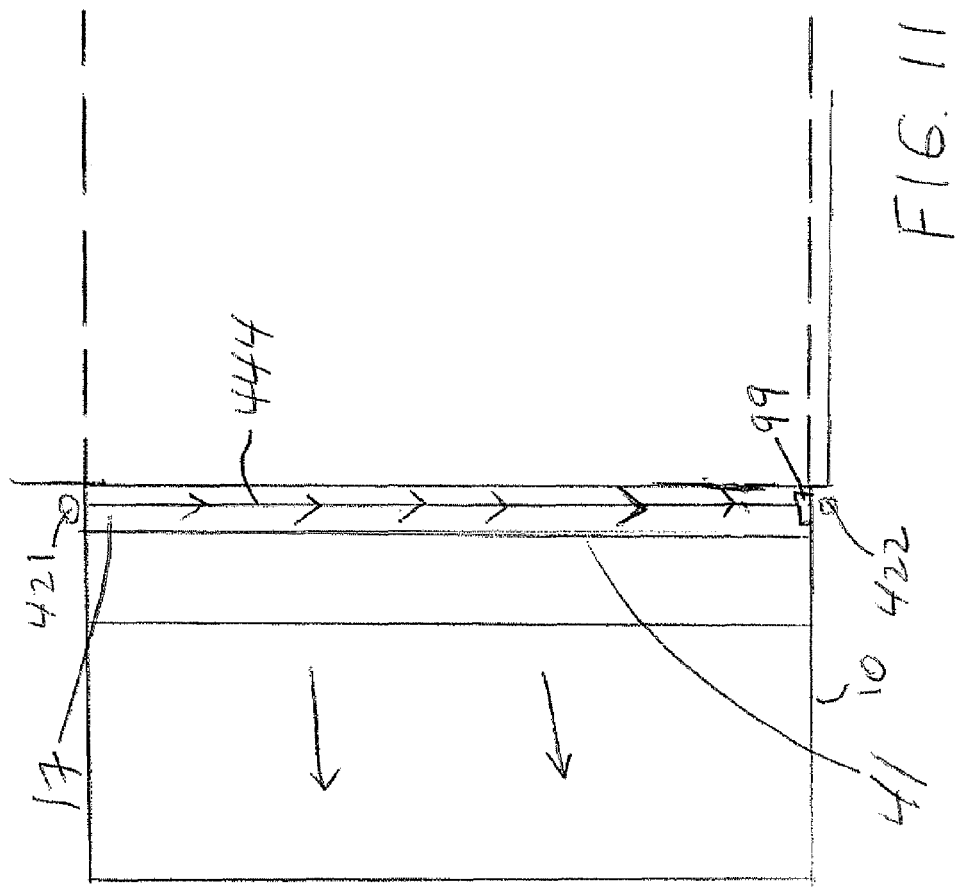

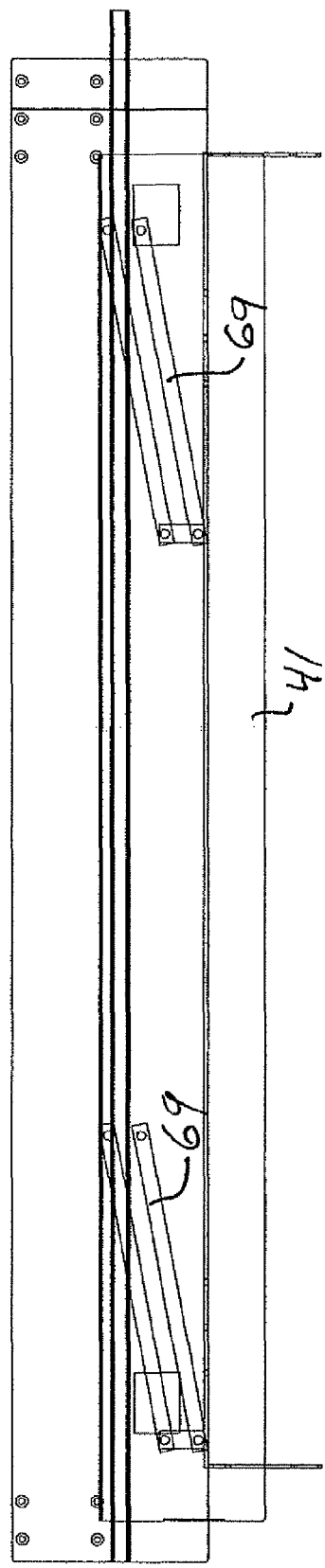

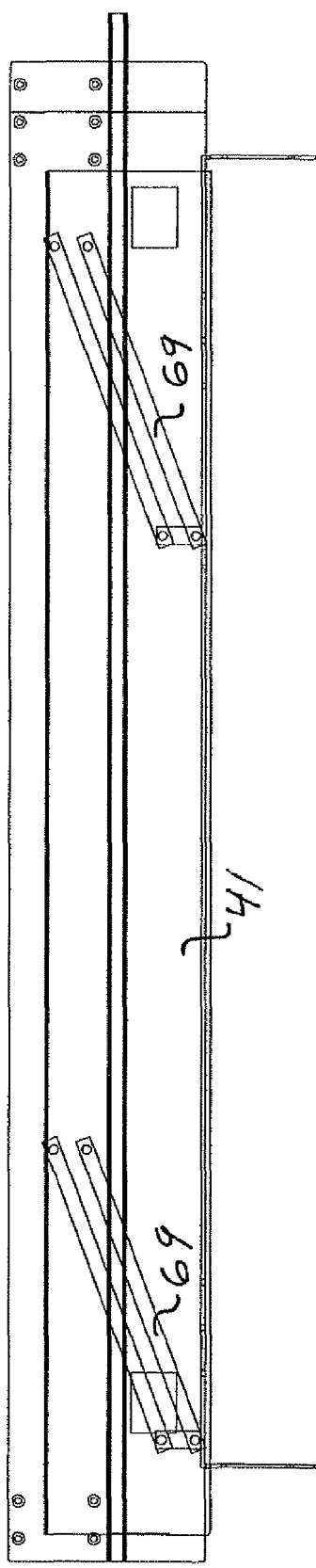

US 8,939,066 B2

CONVEYOR OVEN WITH DOORS AND SENSORS AND MEHOD OF OPERATING SAME

FIELD AND BACKGROUND OF THE INVENTION

The present invention relates to apparatuses and methods for conveyor ovens, and, more particularly, to conveyor ovens with an extension chamber and optical sensors sensing a product in the doorway and signaling when the entrance and exit doors should rotate open, the doors operating independently.

For industrial applications servicing large numbers of food items, conveyor ovens are used instead of the conventional door oven. This has the additional advantage of not having to rely on the skill of the operator as to how long to keep the food item, for example pizza, in the oven. The baking time is determined by the length of the chamber and the speed of the conveyor.

Conventional conveyor ovens are widely used, among other things, for baking, cooking, and heating (hereinafter referred to as "baking") of food items such as pizza. The standard oven has an inlet opening and an outlet opening and a conveyor on which the food items designated for baking are placed. The loss of heat through the inlet and outlet openings is wasteful and leads to increased energy consumption. It also creates a hot and uncomfortable work environment that leads to an additional waste of energy due to the need to air-condition the work environment.

There are approximately 100,000 conveyor ovens in the world in operation (Domino's® alone has 18,000 pizza ovens). The number one consideration in the purchase by a company of a conveyor oven nowadays is energy efficiency. It is well known that baking ovens lose heat when the food item passes through the oven since most conveyor oven sides are open for inlet and outlet. It is known in the prior art to try to solve this problem by using proximity sensors and a controller and a solenoid or motor to operate baffle mechanisms that open and close to minimize heat loss. In U.S. Patent App. Publication no. U.S. 2005/0132899 to Huang, for example, a proximity sensor 40 is used to sense the approach of the food item to the entrance door and the exit door is opened based on a calculation by the controller as to how long it will take the conveyor to carry the food item to the exit door, The controller controls a solenoid that actuates the baffle mechanism. This mechanism is not workable for its intended purpose. It cannot sense food items on all sides of the conveyor; it cannot keep track effectively of a multiplicity of food items that enter the conveyor belt in short intervals of time and space. The baffle mechanism is prone to getting stuck. It is not believed to be a reliable means of achieving significantly reduced heat loss, energy consumption, unnecessary use of air conditioning, worker discomfort, etc.

Another problem arising in these automated systems is that if the system fails, the oven doors are stuck closed and the food in the oven burns and is lost, which may be considered a catastrophe. It can also lead to a fire. Having to shut down the oven for a time until it is fixed causes further business losses.

There is a compelling need to have a conveyor oven and method that significantly reduces heat loss and energy consumption from the oven and that overcomes the drawbacks of the prior art. It would be particularly helpful if such an apparatus or method would prevent catastrophe, would make the worker environment for industrial conveyor ovens more bearable in terms of temperature, and would save on use of air conditioning.

SUMMARY OF THE PRESENT INVENTION

One aspect of the present invention is a further aspect of the present invention is directed to a conveyor oven, comprising a baking oven having an entrance door that rotates at a flexion region to an open position thereby defining an inlet opening and having an exit door that rotates at a flexion region to an open position; a conveyor traversing the baking oven and the entrance and exit doors, the conveyor for holding items on a whole width of the conveyor; an entrance door optical sensor for sensing items that contact a beam of light, the beam of light crossing a width of the conveyor upstream of the entrance door; an exit door optical sensor for sensing items that contact a beam of light, the beam of light crossing a width of the conveyor upstream of the exit door; and a controller for receiving signals from the entrance sensor and from the exit sensor and for controlling when the entrance door and when the exit door are actuated A further aspect of the present invention is a conveyor oven, comprising a baking oven including a baking oven extension chamber at a downstream end of the baking oven, the baking oven having an entrance door that opens to an open position thereby defining an inlet opening and having an exit door situated at an end of the baking oven extension chamber, the exit door opening to an open position; a conveyor traversing the baking oven and the entrance and exit doors; an entrance door sensor upstream of the entrance door; an exit door sensor situated at the baking oven extension chamber upstream of the exit door, the exit door sensor sensing items on the conveyor as the items pass through the baking oven extension chamber, the exit door and the entrance door operating independently of one another; a controller for receiving signals from the entrance sensor and from the exit sensor and in response to these signals controlling when the entrance door and when the exit door are actuated, the controller programmed to actuate the entrance door and the exit door independently.

A still further aspect of the present invention is a method of operating a conveyor oven, comprising (a) passing food items on a conveyor through a baking oven, the baking oven having a baking oven extension chamber; and (b) minimizing heat escaping from the baking oven by rotating an entrance door open whenever a food item crosses an entrance optical beam situated upstream of the entrance door, rotating the entrance door closed after the food item enters the baking oven, rotating an exit door at an exit end of the baking oven extension chamber open whenever the food item crosses an exit optical beam in the baking oven extension chamber, and rotating the exit door closed after the food item leaves the baking oven extension chamber.

A yet still further aspect of the present invention is a conveyor oven, comprising a baking oven having a conventional oven and an extension chamber, an outlet opening of the conventional oven acting as an inlet to the extension chamber, the extension chamber having an exit door; a conveyor running through a length of the baking oven; an exit sensor including a transmitter and a receiver that are attached to the extension chamber on opposite sides of the extension chamber such that an item on the conveyor moving through the extension chamber necessarily interrupts a signal between the transmitted and the receiver, the sensor operatively engaged to a controller for actuating the exit door open and closed.

A further aspect of the present invention is directed to a conveyor oven kit for upgrading a conventional conveyor oven, comprising an extension chamber structured to attached to an exit end of the conventional standard conveyor oven; an inlet door structured to attach to an entrance of the conventional convenyor oven; an inlet door sensor; an outlet door structured to attach to an end of the extension chamber; an outlet door sensor adapted to attach to the extension chamber; a controller for controlling actuation of the pneumatic pistons; and two pneumatic pistons for actuating the inlet and outlet doors respectively.

These and other features, aspects and advantages of the present invention will become better understood with reference to the following drawings, descriptions and claims.

BRIEF DESCRIPTION OF THE DRAWINGS

Various embodiments are herein described, by way of example only, with reference to the accompanying drawings, wherein:

FIG. 2 is a top plan view of a conveyor oven, in accordance with one embodiment of the present invention;

FIG. 4A is an isometric view of a conveyor oven showing the exit door fully rotated open, in accordance with a further embodiment of the present invention;

FIG. 4B is an enlarged view of the circled area within FIG. 4A, in accordance with a further embodiment of the present invention;

FIG. 5A is an isometric view of a conveyor oven showing the exit door closed, in accordance with a further embodiment of the present invention;

FIG. 5B is an enlarged view of the circled area within FIG. 5A, in accordance with a further embodiment of the present invention;

FIG. 6A is an isometric view of a conveyor oven showing the entrance door closed, in accordance with a further embodiment of the present invention;

FIG. 6B is an enlarged view of the circled area within FIG. 6A, in accordance with a further embodiment of the present invention;

FIG. 8A is an isometric view of a conveyor oven showing the entrance door fully open, in accordance with a further embodiment of the present invention;

FIG. 8B is an enlarged view of the circled area within FIG. 8A, in accordance with a further embodiment of the present invention;

FIG. 9 is an enlarged view similar to FIG. 5B except showing an exit door comprised of two separate half-doors, in accordance with a further embodiment of the present invention;

FIG. 11 is a fragmentary isometric view of a mechanical shutter usable to open an exit door of the conveyor oven, in accordance with one embodiment of the present invention; and FIGS. 12A, 12B and 12C are plan views of an exit door illustrating successive rotation open using a pivot arm, in accordance with one embodiment of the present invention.

DETAILED DESCRIPTION OF THE INVENTION

Figure 1:
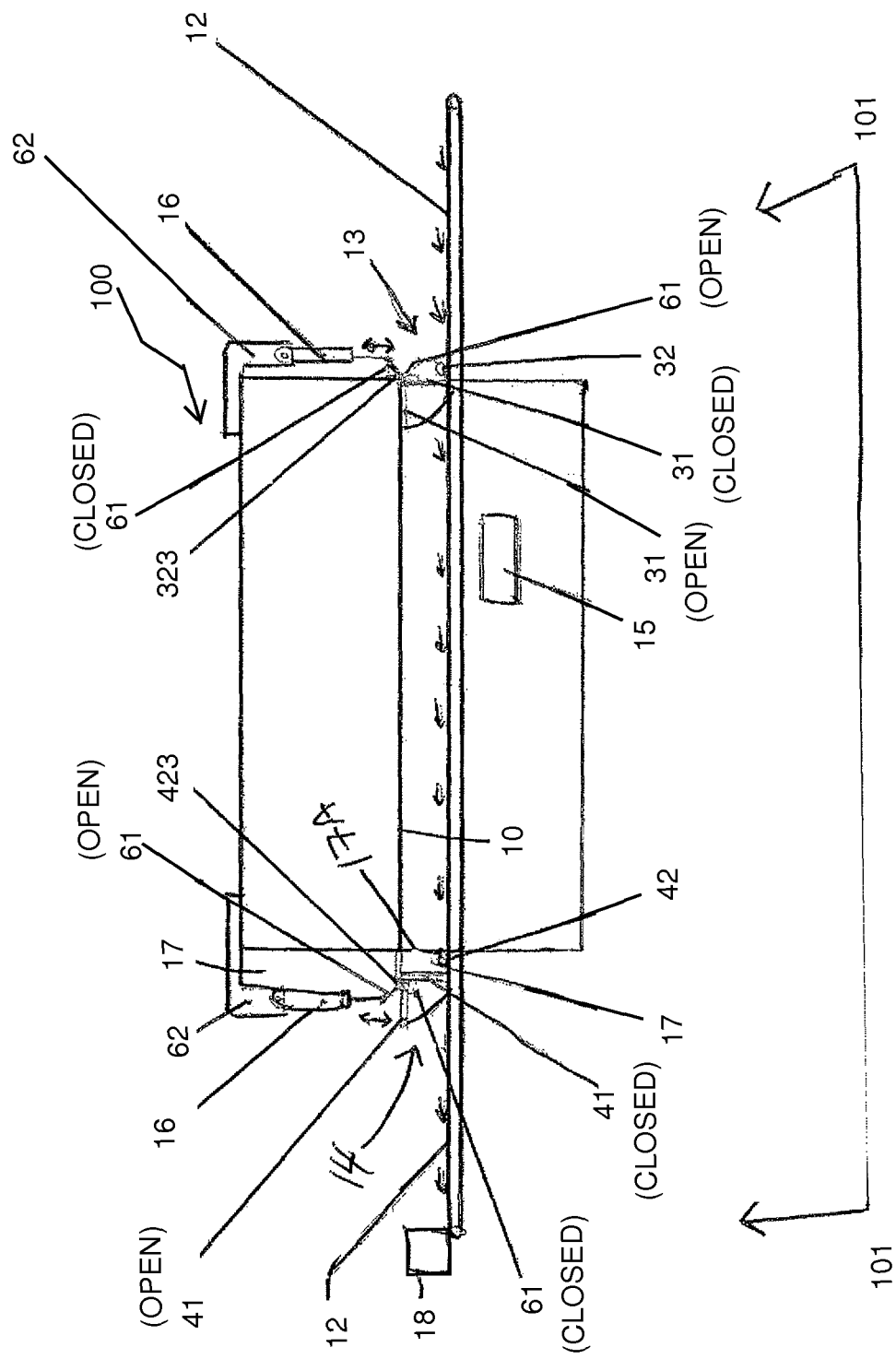
FIG. 1 is a side view of a conveyor oven, in accordance with one embodiment of the present invention.

The following detailed description is of the best currently contemplated modes of carrying out the invention. The description is not to be taken in a limiting sense, but is made merely for the purpose of illustrating the general principles of the invention, since the scope of the invention is best defined by the appended claims.

The present invention generally provides a conveyor oven for industrial baking of food items, such as pizzas. The food items may be placed on a conveyor and may approach an entrance door optical sensor that may be just outside the baking oven chamber and that may that signal a controller to actuate a pneumatic piston which may cause the entrance door to rotate open axially. The baking oven has a baking oven extension chamber. An exit door optical sensor may be situated just upstream of the exit door at the end of the extension chamber. Accordingly, a foot item inside the baking oven extension chamber may cross the light beam that may run through the extension chamber whereupon the exit door optical sensor may (independently of the entrance door sensor) signal the controller to actuate a second pneumatic piston which may cause the exit door to axially rotate open. The controller, after a delay, may close the entrance or exit door respectively. Energy consumption from reduced heat loss may be reduced by at least 20%. The system may be designed to avoid catastrophe.

In contrast to prior art conveyor ovens, in which the conveor oven either has no doors or has a baffle mechanism that is open and closed vertically with linear potion, the conveyor oven of the present invention may include an entrance door and an exit door that may rotate open, thereby avoiding the problem of a baffle mechanism or vertical shutter whose linear motion makes it prone to getting stuck or jammed. In mechanical design, and more specifically regarding linear motion, the length of the slider should be as long as possible and in practice (as a rule of thumb) at least three times longer than the distance of the perpendicular to the motion direction vector of the sum of forces acting on the moving part, Otherwise, it may be prone to getting stuck. The conveyor ovens may be eighty-five centimeters wide. The linear motion may be seven centimeters since industrial conveyor ovens try to minimize heat loss by only opening the amount necessary for the thickest food item to pass through it and have a standard outlet and inlet of seven centimeters. In the prior art conveyor ovens, see, e.g. U.S. Patent App. Publication no. U.S. 2005/0132899 to Huang, a proximity sensor 40 may be used to sense the approach of the food item to the entrance door and the exit door is opened based on a calculation by the controller as to how long it will take the conveyor to carry the food item to the exit door, Since the conveyor is typically 85 centimeters wide and since proximity sensors work within a range of 10-15 centimeters, one would need an extra sensitive proximity sensor that would generate false positive detections of motion in order to detect pizzas on both sides of the oven (placing the food items on different sides is a common occurrence under the pressure atmosphere of fast food preparation services). Use of multiple proximity sensors is either impractical or expensive. In contrast, the conveyor oven of the present invention may use an optical sensor comprising a transmitter and a receiver, with specially designed irises, whose light beam may traverse the entire width of the conveyor and thereby detect food items for the entire width of the oven's conveyor belt. Moreover, the exit door may have its own optical sensor so that it is not opened based on when the entrance door is opened. Since it is common for many food items to be placed on the conveyor belt at short intervals from one another and hence pass through the entrance door at short time intervals, this makes it possible to keep track of all these items simultaneously and program the controller to know when to actuate the entrance and exit doors for each item, something that it is impossible with proximity sensors. In further contrast to the conveyor ovens of the prior art, in which a simple baking oven is utilized, the present invention may utilize a baking oven that has a baking oven extension chamber. This makes it possible to have an independent exit door sensor since placing the exit door sensor upstream of the exit door puts the sensor in the oven where the intense heat of the oven would destroy it. The optical sensor may be attached to the extension chamber beyond the direct heat of the oven but its light beam may traverse the extension chamber upstream of the exit door. This may further provide the advantage of being able to retrofit existing industrial conveyor ovens with the apparatus of the present invention since drilling a hole in the thick wall of an existing oven to fasten the optical sensor to the oven and keep it outside the heat near the exit door is impossible. Instead, the fastening may occur to the wall of the extension chamber which may be made thinner. This extension chamber may be attached to the end of the conventional industrial oven. In still further contrast to prior art industrial conveyor ovens in which a solenoid or motor may be used to actuate the baffle mechanism (see Huang), the present invention may utilize a pneumatic piston. A solenoid, which operates based on magnetic force which decreases inversely proportional to the square of the distance, and cannot effectively control movement seven centimeters away, without the solenoid being very expensive. A motor requires a gear and a driver, making it complex and unreliable without making it very expensive. In contrast, the pneumatic piston used in the present invention can easily cover the 7 centimeter distance reliably and costs only $10 to $15. In further contrast to the prior art, in which conveyor ovens leak a large amount of heat during operation, thereby wasting energy and rendering the operator's working conditions very uncomfortable, the conveyor oven of the present invention may reduce gas consumption by retaining the heat in the oven. Applicant tested a conveyor oven having the apparatus of the present invention for 25 days and by measuring the gas meter daily, found a gas consumption reduction from 6.15 cubic meters down to 4.62 cubic meters. Applicant tested the savings of liquid propane gas (lpg) daily consumption in two separate facilities using the conveyor oven of the present invention and recorded its reduction at 25% and 27%. The reduction in heat leakage from the oven also reduces use of air conditioning thereby further saving energy consumption. Furthermore, less carbon dioxide is emitted since there is less burning of gas needed to maintain the oven at 270 degrees Celsius. In still further contrast to the prior art, in which the danger of a failed apparatus may result in a catastrophic situation in which the oven doors are shut, risking inaccessibility and destruction of the food items and possible fire, the conveyor oven of the present invention may be more reliable in that failure of its pneumatic piston and/or optical sensors may not result in the oven doors being shut; rather the doors would be left open in the event of failure. This is because in some embodiments a spring may urge the piston upward, resulting in the oven doors rotating open, and the pneumatic piston may counteract the force of the spring so as to only close the doors as necessary (i.e. when a signal from the beams are received).

The principles and operation of a conveyor oven with doors and sensors, according to the present invention may be better understood with reference to the drawings and the accompanying description.

As seen from FIG. 1, and from FIGS. 6A, 6B, 7A, 7B, 8A, 8B which show the entrance door in various positions, a conveyor oven 100 may comprise a baking oven 10 having an entrance door 31 (used interchangeably with "inlet opening door") that may rotate axially at a flexion region 44 such as a hinge or pivot to an open position thereby defining an inlet opening 13. As seen from FIGS. 3A, 3B, 4A, 413, 5A, 513, conveyor oven 100 may also have an exit door 41 (used interchangeably with "outlet opening door") that may rotate axially at a flexion region such as a hinge or pivot to an open position. Although exit door 41 may define an opening when it opens, exit door 41 may be positioned downstream of the outlet opening 14 of baking oven 10, as explained further below. In general baking oven 10 is designed and constructed like existing conveyor ovens and the present invention refers to an upgrading of the standard oven whereby it is equipped also with the doors and sensors system, as specified herein. Accordingly, the baking oven extension chamber 17 may be added/retrofitted to an existing standard oven. The inlet opening 13, the outlet opening 14 and the exit door 41 may be designed to allow passage of food items seven centimeters high. In order embodiments, they may allow passage of items ten centimeters high.

As shown in FIGS. 1-2, the inlet door 31 may cover the inlet opening 13 down to slightly above the top surface of the conveyor 12 in a way that enables the conveyor 12 to move into the interior of the oven 10 even when the inlet door 31 is closed. The inlet door 31 may have the general shape of a flat plate and its size may correspond to that of the inlet opening 13. The inlet door 31 may open and close on an axial hinge 323 such that when the inlet door 31 opens, it opens inward, into the interior of the oven 10. The same is true for the outlet door 41 which also may have an axial hinge 423 but may open from the interior of the oven 10 outward.

Conveyor oven 100 may include a conveyor 12 that may traverse the baking oven 10 and the entrance and exit doors 31, 41. Conveyor 12 may hold food items and may be able to do so at any portion of the width of the conveyor belt.

As shown in FIG. 1 and in FIGS. 6A, 6B, 7A, 7B, 8A, 8B, conveyor oven 100 may also include an entrance door sensor 32, which may be an entrance door optical sensor 32, for sensing food items that contact the beam of light of sensor 32. The beam of light may cross the width of the conveyor upstream of the entrance door and may be located near entrance door 31, such as within ten centimeters of the entrance door 31.

As seen in FIG. 1 and in FIGS. 3A, 3B, 4A, 4B, 5A, 513, conveyor oven 100 may also include an exit door optical sensor 42 for sensing food items that contact the exit door optical sensor's 42 beam of light, the beam of light crossing a width of the conveyor upstream of the exit door and located near exit door 41, such as within ten centimeters of the exit door. Baking oven 10 may include a baking oven extension chamber 17 in open communication with the inside of the conventional oven representing the remaining portion of baking oven 10. Accordingly, as seen in FIG. 2 components 422, 421 of exit door sensor 42 may be situated at the baking oven extension chamber 17 upstream of the exit door 41, While the actual components of exit door sensor 42 may be attached to extension 17 on the outside of the baking oven extension chamber 17, the optical beam (not shown) or other interruptable signal between the sensor components 422, 421 may pass through the baking oven extension chamber 17 from one side of its width to the other. Accordingly, exit door sensor 42 may sense items, such as food items, on the conveyor 12 as these food items pass through the baking oven extension chamber 17. Consequently, the exit door 41 and the entrance door 31 may operate independently of one another and similarly, the entrance door sensor 32 and the exit door sensor 42 may operate independently of one another. The controller 15 need not base actuation of the exit door 41 on when the entrance door 31 was actuated or when the inlet sensor 32 sent a signal that a food item passed it.

The sensor 42 of the outlet door 41 may be positioned outside the oven 10 at a slight distance from the outlet opening 14 so that sensor 42 is not be within the interior of the oven where the temperature is especially high, which would prevent use of a common, standard sensor. The outlet door 42 may, therefore, be positioned outside the baking oven extension chamber 17, which is an extension chamber added to the conventional oven 11 of baking oven 10 to prevent loss of heat from the interior of the oven 10 through the gap between the outlet opening 14 and the outlet door 41 and also to support the outlet opening door 41. The extension chamber 17 may be made of a top plate and two side plates. The side plates of the extension chamber 17 may be and should be made of a material that will enable the sensor 42 to function, and in case of an optical sensor 42, the said plates should be made of a transparent material, such as glass. It is also possible that a hole be located in each of the said plates to enable passage of the said light beam. After the item exits the interior of the conventional oven 11 of baking oven 10 through the outlet opening 14, it may enter the extension chamber 17 where the sensor 42 detects its presence and sends an appropriate signal that causes the outlet door 41 to open, for example by rotating axially, just before the item reaches the door 41.

As seen in FIGS. 1-2, conveyor oven 100 may also include a controller 15 for receiving signals from the entrance door sensor 32 and from the exit door sensor 42 and for controlling when the entrance door 31 and when the exit door 41 are actuated. More directly, the controller 15 may control actuation of at least one pneumatic piston 16 operatively engaged to entrance door 31 and at least one pneumatic piston 16 operatively engaged to exit door 41 so that actuation or de-actuation of the piston may close or open the exit, entrance door 41, 31.

Figure 12A:
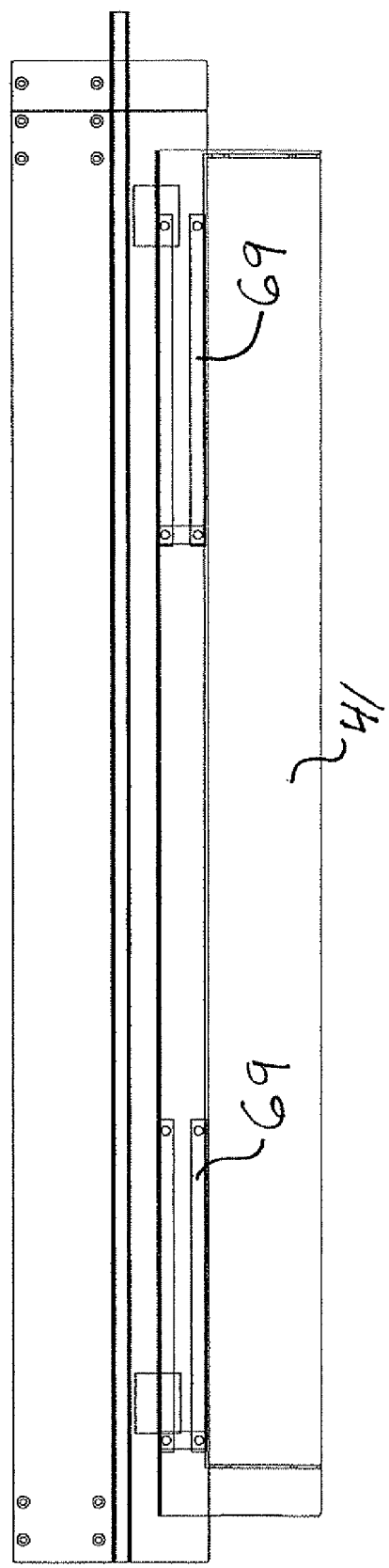

The pneumatic piston 16 (which may be based on air or may be a hydraulic piston) may be attached to oven 10 by means of bracket 62 (see FIG. 1), may be attached or operatively engaged to the doors 31, 41, for example by means of an arm 61 and may open and close the doors 31, 41 following commands that it receives from the controller 15. As noted, entrance and exit doors 31, 41 may rotate at a flexion region 44. As shown in FIG. 12A, instead of the flexion region 44 comprising a hinge 323, 423, as shown in FIG. 2, flexion region 44 may comprise a pivot arm 69 that may move so as to guide exit door 41 or entrance door 31 along an arced track (not shown) or guide that is not a sharp curve so that doors 31, 41 move primarily vertically but also partially horizontally. This avoids having the doors 31, 41 move in linear motion so as to avoid the problems, such as getting stuck, associated with such linear motion. FIG. 12B shows the pivot arms 69 having rotated to open the exit door 41 partially and FIG. 12C shows a view similar to FIG. 12B but after full rotation of pivot arms 69 so that exit door is now open.

However, in order to prevent a catastrophic situation if either the pneumatic piston or the optical sensor fails and the oven doors remain shut, the apparatus may be designed to default to an "open oven" situation whenever either or both of the optical sensors 32, 42 and pneumatic pistons 16 fail to operate. For example, the pneumatic piston 16 close at least one of the entrance door and the exit door by opposing a force of a spring such that if the pneumatic piston fails the at least one of the entrance door and the exit door remain open, thereby averting catastrophic consequences of a closed baking oven that cannot be opened. Spring 19 may urge the pneumatic piston up so as to maintain the at least one of the entrance door and the exit door open until the pneumatic piston is actuated to counteract force of the spring by moving downward.

Sensors 32, 42 may be capable of detecting items on the conveyor and sending a signal accordingly. Preferably, sensors 32, 42 are optical sensors composed of a transmitter 321, 421 and a receiver 322, 422 located on either side of the conveyor upstream of and close to the inlet opening 13 or outlet door 41, respectively. Note that outlet or exit sensor 42 may be slightly downstream of outlet or exit opening 17A of the conventional oven 11 yet upstream of exit door 41 and of the outlet opening 14 of extension chamber 17/baking oven 10. An optical beam or other interruptable signal may run between the two parts of the sensor 32, 42 such that when there is an item on the conveyor designated to be baked in the oven, the sensor 32, 42 sends a signal to the controller 15 which in turn sends an appropriate signal to the pneumatic piston 16 to open the inlet door 31 or the outlet 41 door. When the sensor 32, 42 detects that the item has passed and that there are no additional items on the conveyor, a signal is sent to the controller 15 which may send a signal to the actuator, which may be a pneumatic piston 16 to close the appropriate door 31, 41. This signal may be sent after a short delay (holding time) in order to prevent repeated opening and closing of the door 31, 41 when items are located on the conveyor at small intervals and also so to prevent the door from closing on the item itself.

This may prevent the sensors could cause the doors to open and close at an inefficient and rapid pace when there are items on the conveyor that are designated to be warmed and baked in the interior of the oven and items are positioned on the conveyer at small intervals. Instead, the delay action may cause the doors to close only when the user indeed stops placing items on the conveyor for a certain period of time. The holding time is intended to prevent the door from hitting the item upon closing, since the beam between the sensors is located in parallel and at a certain distance from the door line. In other words, when the item passes through the beam's line it is still located opposite and under the door line for a certain period of time. The holding time is controlled by programming the controller and is adjusted according to the conveyor's speed, the speed at which the door closes, and the dimensions of the items and the door.

As seen in FIG. 1, baking oven 10 may also be equipped with a visual or audio warning device 18 that indicates to the oven operator that the outlet door 41 has closed and that the food item exiting the baking oven 10 is ready for collection.

Regarding the entrance and exit doors, the terms "operating independently" and "independently timed" refer to the fact that the exit door does not operate in a manner dependent on the timing of the operation of the entrance door or of the entrance door sensor.

The present invention may also be described as a conveyor oven 100 comprising a baking oven 10 that includes a conventional oven 11 and an extension chamber 17. An outlet opening 17A of the conventional oven may act as an inlet to the extension chamber 17. Extension chamber may have an exit door 41. A conveyor 12 may run through the length of the baking oven 10. An exit sensor 42 may include a transmitter 421 and a receiver 422 that are attached to the extension chamber 17 on opposite sides of the extension chamber 17 such that an item on the conveyor 12 moving through the extension chamber 17 necessarily interrupts a signal, such as a light beam positioned within a centimeter up from the conveyor 12, between the transmitted 421 and the receiver 422. The sensor 42 may be operatively engaged to a controller 15 that may actuate the exit door 41 open and closed, for example by actuating a pneumatic piston 16 that urges the exit door 41 to rotate to a closed position against the force of a spring that urges the exit door 41 open. Exit door 41 may open and close by rotating axially. Baking oven 10 may further comprise an entrance door 31 structured to rotate to an open position and thereby define an inlet opening 13 when an item on the conveyor nears the entrance door 31 and interrupts a signal of an entrance sensor 32 that may be situated upstream of the entrance door 31.

Controller 15 may receiving signals from the entrance sensor and from the exit sensor and controller 15 may also receive a signal when the exit door is closed. Accordingly, a warning device that is selected from a visual warning device and an audio warning device may be operatively engaged to the controller so as to receive a signal to be actuated when the exit door has closed.

As seen from FIG. 9, the present invention may be described as a method 100 of operating a conveyor oven. Method 100 may have a step 110 of passing food items on a conveyor through a baking oven, the baking oven having a baking oven extension chamber. Method 100 may also have a further step 120 of minimizing heat escaping from the baking oven by (a) rotating an entrance door open whenever a food item crosses an entrance optical beam situated upstream of the entrance door, (b) rotating the entrance door closed after the food item enters the baking oven, (c) rotating an exit door at an exit end of the baking oven extension chamber open whenever the food item crosses an exit optical beam in the baking oven extension chamber, and (d) rotating the exit door closed after the food item leaves the baking oven extension chamber.

In some versions, method 100 may further comprise using a controller controlling actuation of an at least one pneumatic piston, the at least one pneumatic piston operatively engaged to the at least one of the entrance door and the exit door, in order to rotate the exit and entrance doors open and closed. Method 100 may in some versions also comprise, for at least one of the entrance door and the exit door, mechanically urging a pneumatic piston engaged to the at least one of the entrance door and exit door up so as to maintain the at least one of the entrance door and exit door open unless at least one of the entrance optical beam and the exit optical beam signals a controller to actuate the pneumatic piston downward.

As seen in FIG. 1, a further embodiment of the present invention, a conveyor oven retrofit or installation kit 101 for upgrading a conventional conveyor oven 11 may contain an inlet door 31, an inlet door sensor 32, an outlet door 41, an outlet door sensor 42, a controller 15, a pneumatic piston 16, an extension chamber 17 that can be installed on existing, standard conveyor ovens 11. The kit 10 may also contain a warning device 18.

Figure 10:
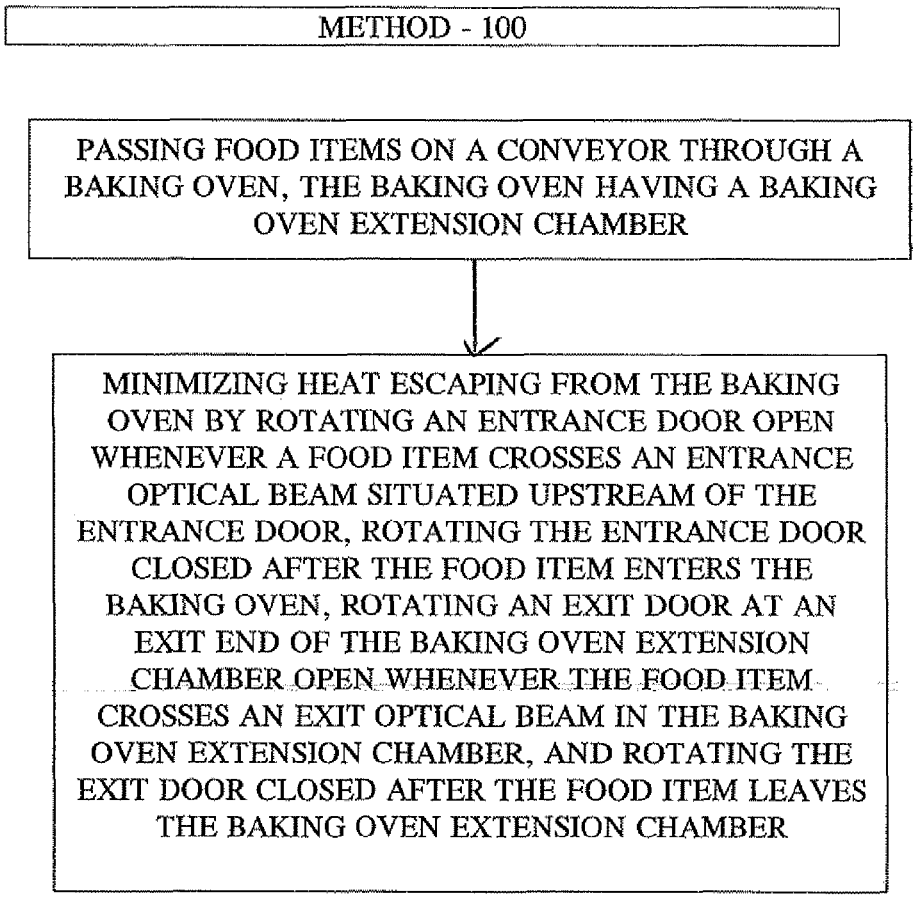
FIG. 10 is a flow chart showing a method in accordance with one embodiment of the present invention.

As seen in FIG. 10, in certain preferred embodiments, the advantages of the present invention may be further enhanced by constructing exit door 41 such that exit door 41 is comprised of two half-doors, a first half-door and a second half-door. In this way, and since pizza and certain other food may be narrower than half the width of the conveyor oven, which may be 85 centimeters wide, only one half-door comprising one half of the width of the exit door 41 need open in most cases. The same may be done for entrance door 31 which may be comprised of two half-doors (not shown) whereby one half-door of entrance door 31 opens and the other half remains closed when food items narrower than half the width of the oven pass through. Whether for exit door 41 or entrance door 31, one piston 16 of the at least one pneumatic piston 16 may be situated on one side of the oven so as to be connected to one of the half-doors and a second piston 16 of the at least one piston may be situated on the other side of the oven so as to be connected to the other one of the half-doors.

Figure 3A:
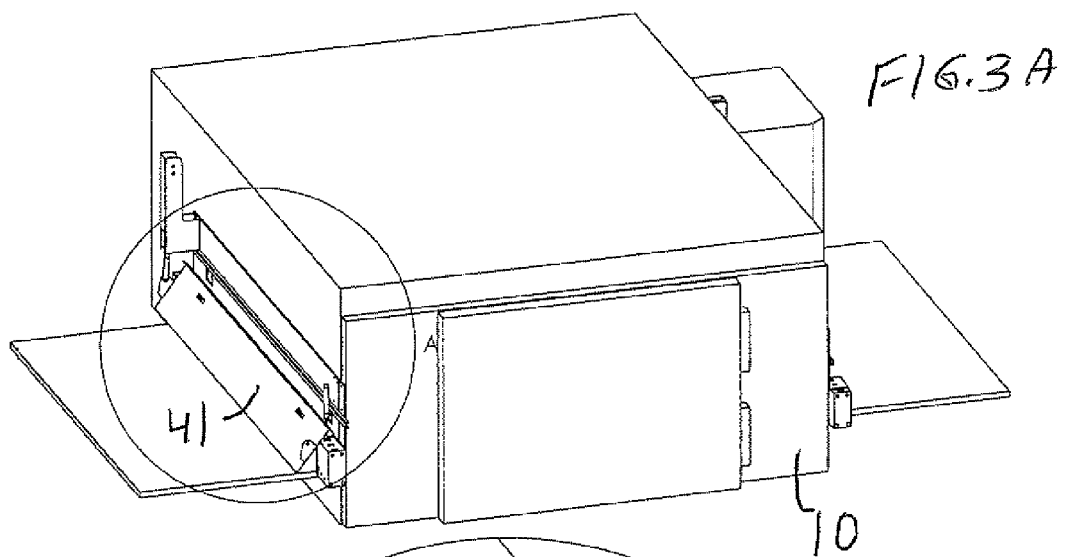
FIG. 3A is an isometric view of a conveyor oven showing the exit door partially rotated open, in accordance with a further embodiment of the present invention.
Figure 3B:
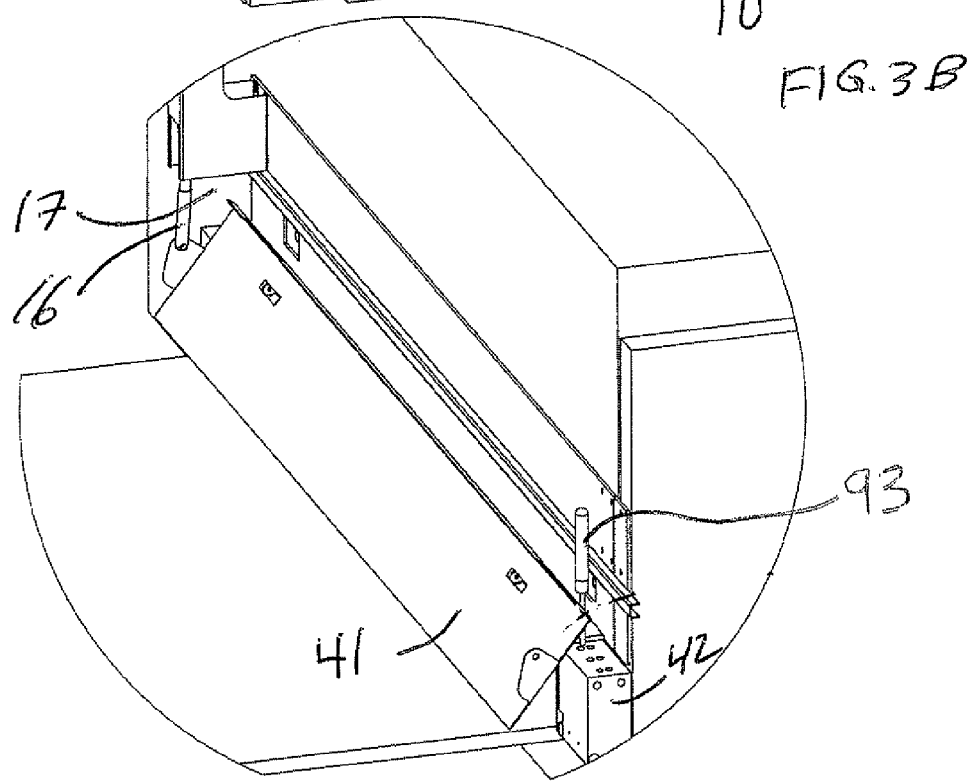
FIG. 3B is an enlarged view of the circled area within FIG. 3A, in accordance with a further embodiment of the present invention.
Figure 7A:
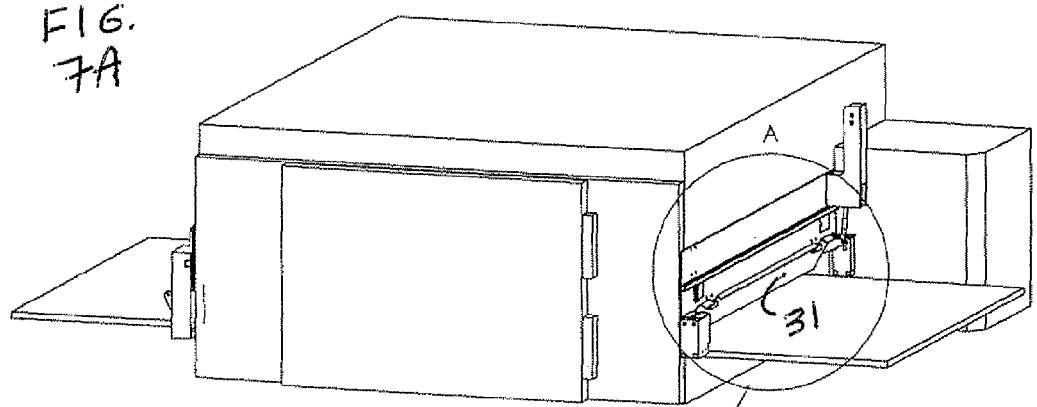
FIG. 7A is an isometric view of a conveyor oven showing the entrance door partially open, in accordance with a further embodiment of the present invention.
Figure 7B:
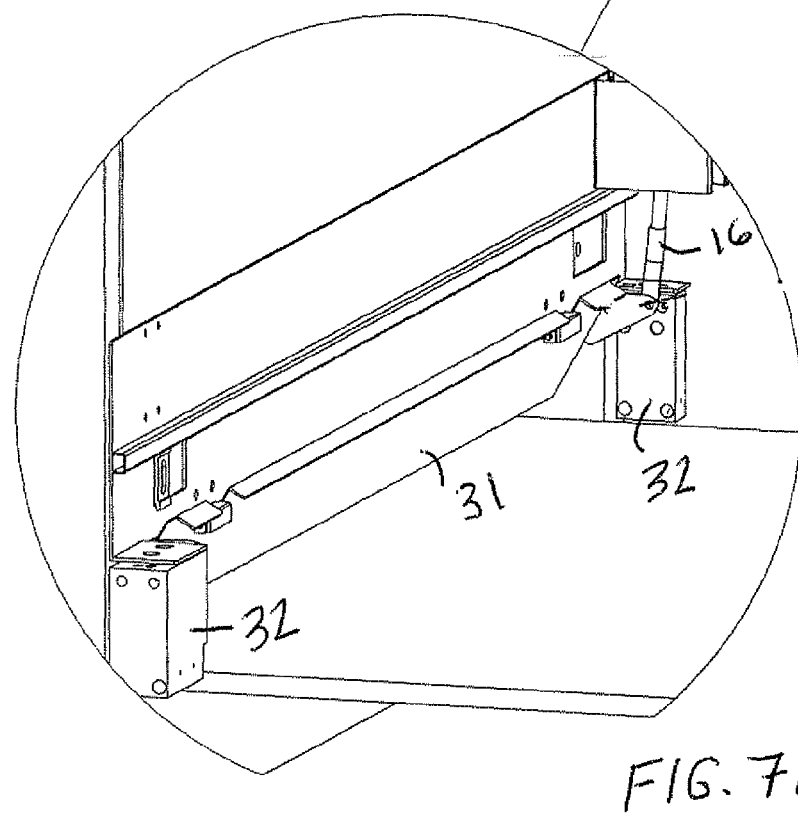
FIG. 7B is an enlarged view of the circled area within FIG. 7A, in accordance with a further embodiment of the present invention.

In some preferred embodiments, as seen in FIG. 3B, FIG. 4B and FIG. 5B, oven 10 may also comprise an actuator 93 for manually opening the exit door 41 in order to manually re-insert a food item in order to bake the food item further (i.e. to make them "well-done"). In the entrance, if the user needs to open the entrance door 31 manually all the user needs to do is to manually cause interference to the beam of light thus blocking the beam, and the entrance door 31 will be opened immediately. The entrance door 31 will not shut for the set period of time which is the time required for a food item to clear the doorway. This is not the case for the exit. If the user needs to open the exit door 41 manually by manually interfering with the beam of light in order to return a pizza into the oven for extra backing to make it well done, the user cannot do so because the beam may be behind the exit door 41 and the exit door is shut. Accordingly, as shown in FIG. 11, oven 10 may also comprise a special mechanical shutter 99 that may be actuated by actuator 93 and that is able to obstruct the optical beam. Mechanical shutter 99 may be situated at the side of the oven 10. In one version, the user needs to push on this actuator in order to cause the shutter 99 to block the optical beam 444 (shown schematically in FIG. 11) of the sensor comprising the transmitter 421 and receiver 422 and thereby open the exit door 41 even when no food item is on the conveyor. Shutter 99 may be capable, in an actuated mode, of interrupting the beam of light 444 crossing a width of the conveyor 10 upstream of the exit door 41.

While the invention has been described with respect to a limited number of embodiments, it will be appreciated that many variations, modifications and other applications of the invention may be made. Therefore, the claimed invention as recited in the claims that follow is not limited to the embodiments described herein.

What is claimed is:

1. A conveyor oven for baking food items, comprising:
a baking oven including a baking oven extension chamber at a downstream end of the baking oven, the baking oven having an entrance door that rotates at a hinge to an open position thereby defining an inlet opening and having an exit door that is situated at a downstream end of the baking oven extension chamber and that rotates at a hinge to an open position;
a conveyor traversing the baking oven and the entrance and exit doors, the conveyor for holding food items on a whole width of the conveyor;
an entrance door optical sensor for sensing food items that contact a beam of light, the beam of light crossing a width of the conveyor upstream of the entrance door;
an exit door optical sensor for sensing items that contact a beam of light, the beam of light crossing a width of the conveyor upstream of the exit door; and
a controller for receiving signals from the entrance sensor and from the exit sensor and in response to these signals controlling when the entrance door and when the exit door are actuated, the controller programmed to actuate the entrance door and the exit door independently of one another.

2. The conveyor oven of claim 1, wherein the light beam of the exit door optical sensor is situated in a baking oven extension chamber.

3. The conveyor oven of claim 1, wherein the entrance door rotates open axially and the exit door rotates open axially.

4. The conveyor oven of claim 1, wherein at least one of the exit door and the entrance door is comprised of a first and a second half-door.

5. The conveyor oven of claim 1, wherein a pivot arm pivots to rotate the exit door open and closed.

6. The conveyor oven of claim 1, further comprising a shutter configured, in an actuated mode, to block the full beam of light crossing a width of the conveyor upstream of the exit door so as to trigger an opening of the exit door even when no item held on the conveyor contacts the beam of light upstream of the exit door.

7. A conveyor oven for baking food items, comprising:
a baking oven including a main oven and a baking oven extension chamber the baking oven extension chamber at a downstream end of the baking oven, the baking oven having an entrance door that rotates at a first flexion region to an opens position inwardly into the interior of the main oven thereby defining an inlet opening and having an exit door situated at a downstream end of the baking oven extension chamber thereby defining an outlet opening, the exit door rotating open at a second flexion region outwardly in a direction away from the interior of the main oven to an open position, the inlet opening defining a plane on which the first flexion region at least partially lies, the outlet opening defining a plane on which the second flexion region at least partially lies,
a conveyor traversing the baking oven and the entrance and exit doors;
an entrance door sensor upstream of the entrance door;
an exit door sensor situated at the baking oven extension chamber upstream of the exit door, the exit door sensor sensing items on the conveyor as the items pass through the baking oven extension chamber, the exit door and the entrance door operating independently of one another;
a controller for receiving signals from the entrance sensor and from the exit sensor and in response to these signals controlling when the entrance door and when the exit door are actuated, the controller programmed to actuate the entrance door and the exit door independently.

8. The conveyor oven of claim 7, wherein an optical beam of the exit door sensor crosses a width of the baking oven extension chamber inside the baking oven extension chamber and wherein food items contacting the optical beam trigger rotation of the exit door to the open position.

9. The conveyor oven of claim 7, wherein the baking oven extension chamber is open to an inside of a remainder of the baking oven.

10. The conveyor oven of claim 7, wherein the baking oven extension chamber can be added/retrofitted to existing baking ovens.

11. The conveyor oven of claim 7, wherein the entrance door opens by rotating and wherein the exit door opens by rotating, and wherein the controller is programmed to open at least one of the entrance door and exit door rotates by default whenever at least one of the following fails to operate: (i) an actuator of the entrance door or of the exit door, (ii) the exit door sensor or the entrance door sensor.

12. The conveyor oven of claim 7, wherein at least one of the entrance door and the exit door are actuated by a pneumatic piston controlled by the controller.

13. The conveyor oven of claim 12, wherein the pneumatic piston closes the at least one of the entrance door and the exit door by opposing a force of a spring such that if the pneumatic piston fails the at least one of the entrance door and the exit door remain open, thereby averting catastrophic consequences of a closed baking oven that cannot be opened.

14. The conveyor oven of claim 13, wherein a spring urges the pneumatic piston up so as to maintain the at least one of the entrance door and the exit door open.

15. A method of operating a conveyor oven for baking food items, the method comprising:
(a) passing food items on a conveyor through a baking oven, the baking oven having a main oven and a baking oven extension chamber; and
(b) minimizing heat escaping from the baking oven by rotating an entrance door open on a first flexion region to an open position inwardly into the interior of the main oven to define an inlet opening, the inlet opening defining a plane on which the first flexion region at least partially lies, whenever a food item crosses an entrance optical beam situated upstream of the entrance door, the entrance optical beam generated by an entrance door sensor,
rotating the entrance door closed after the food item enters the baking oven, the entrance door in a closed position not situated in the main oven,
rotating an exit door at an exit end of the baking oven extension chamber outwardly away from the interior of the oven at a second flexion region to an open position to define an outlet opening whenever the food item crosses an exit optical beam in the baking oven extension chamber, the exit optical beam generated by an exit door sensor, the outlet opening defining a plane on which the second flexion region at least partially lies,
rotating the exit door closed after the food item leaves the baking oven extension chamber, and
urging at least one of the entrance door and exit door to an open position so that the at least one of the entrance door and exit door defaults to said open position whenever at least one of the following fails to operate: (i) an actuator of the entrance door or of the exit door, (ii) the exit door sensor or the entrance door sensor.

16. The method of claim 15, further comprising using a controller controlling actuation of an at least one pneumatic piston, the at least one pneumatic piston operatively engaged to the at least one of the entrance door and the exit door, in order to rotate the exit and entrance doors open and closed.

17. The method of claim 15, further comprising, for at least one of the entrance door and the exit door, mechanically urging a pneumatic piston engaged to the at least one of the entrance door and exit door up so as to maintain the at least one of the entrance door and exit door open unless at least one of the entrance optical beam and the exit optical beam signals a controller to actuate the pneumatic piston downward.

18. A conveyor oven kit for upgrading a conventional conveyor oven for pizza, comprising:
an extension chamber structured to be attached to an exit end of the conventional conveyor oven;
an inlet door structured to attach to an entrance of the conventional convenyor oven;
an inlet door sensor;
an outlet door structured to attach to an end of the extension chamber;
an outlet door sensor adapted to attach to the extension chamber;
two pneumatic pistons for actuating the inlet and outlet doors respectively; and
a controller for controlling actuation of the pneumatic pistons.

19. The method of claim 15, further comprising configuring the entrance and exit doors to open by default whenever at least one of the following fails to operate: (i) an actuator of the entrance door or of the exit door, (ii) the exit door sensor or the entrance door sensor.

20. The conveyor oven for baking food items of claim 7, wherein the entrance door lies on the plane defined by the inlet opening when the entrance door is in a closed position and wherein the exit door lies on the plane defined by the outlet opening when the exit door is in the closed position.

* * * * *